United States Patent
Hessler et al.

(10) Patent No.: US 11,979,353 B2
(45) Date of Patent: May 7, 2024

(54) METHODS, WIRELESS DEVICE AND NETWORK NODE FOR COMMUNICATION IN A WIRELESS NETWORK

(71) Applicant: Telefonaktiebolaget LM Ericsson (publ), Stockholm (SE)

(72) Inventors: Martin Hessler, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 540 days.

(21) Appl. No.: 17/275,779

(22) PCT Filed: Oct. 19, 2018

(86) PCT No.: PCT/SE2018/051066
§ 371 (c)(1),
(2) Date: Mar. 12, 2021

(87) PCT Pub. No.: WO2020/080987
PCT Pub. Date: Apr. 23, 2020

(65) Prior Publication Data
US 2022/0052817 A1    Feb. 17, 2022

(51) Int. Cl.
*H04L 5/00*        (2006.01)
*H04W 64/00*    (2009.01)

(52) U.S. Cl.
CPC .......... *H04L 5/0051* (2013.01); *H04L 5/0055* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2007/0254598 A1 | 11/2007 | Bachl et al. | |
| 2014/0024378 A1 | 1/2014 | Khude et al. | |
| 2017/0064652 A1 * | 3/2017 | Kela | H04L 5/0048 |

(Continued)

FOREIGN PATENT DOCUMENTS

| | | |
|---|---|---|
| CN | 1582034 A | 2/2005 |
| CN | 106233684 A1 | 12/2016 |

(Continued)

OTHER PUBLICATIONS

PCT International Search Report and Written Opinion dated Jun. 20, 2019 for International Application No. PCT/SE2018/051066, 9 pages.

(Continued)

*Primary Examiner* — Saumit Shah
(74) *Attorney, Agent, or Firm* — Sage Patent Group

(57) ABSTRACT

Methods, wireless device (200) and network node (202), for communication between the wireless device and the network node in a wireless network. The wireless device transmits (2:1, 2:3) a predetermined first pilot P1 associated with the wireless device, to indicate that the wireless device is in idle state. The wireless device further transmits (2:5) transmit a predetermined second pilot P2 associated with the wireless device, to indicate that the wireless device is in active state. Thereby, the network node is able to perform positioning (2:2) of the wireless device based on the first pilot P1, and to allow access (2:7) to the network when receiving the second pilot P2.

18 Claims, 4 Drawing Sheets

(56) References Cited

U.S. PATENT DOCUMENTS

| | | | |
|---|---|---|---|
| 2017/0078069 A1* | 3/2017 | Jia | H04W 72/04 |
| 2018/0049100 A1 | 2/2018 | Tenny et al. | |
| 2018/0069651 A1* | 3/2018 | Davydov | H04W 72/30 |
| 2018/0206246 A1 | 7/2018 | Zhang et al. | |
| 2018/0241522 A1 | 8/2018 | Karout et al. | |
| 2019/0320402 A1* | 10/2019 | Ji | H04W 4/06 |
| 2020/0008222 A1* | 1/2020 | Cao | H04L 1/1896 |
| 2020/0162219 A1* | 5/2020 | Nasiri Khormuji | H04L 5/0048 |

FOREIGN PATENT DOCUMENTS

| | | |
|---|---|---|
| CN | 106465167 A1 | 2/2017 |
| WO | 2014032892 A1 | 3/2014 |
| WO | 2015192884 A1 | 12/2015 |
| WO | 2018028925 A1 | 2/2018 |
| WO | 2018091081 A1 | 5/2018 |
| WO | 2018127843 A1 | 7/2018 |

OTHER PUBLICATIONS

Extended European Search Report for European Patent Application No. 18937117.2 dated Apr. 26, 2022, 11 pages.

Ericsson; "Introduction of Shared Network Area information support"; 3GPP TSG-RAN WG3 Meeting #31, R3-022134; Stockholm, Sweden; Aug. 19-23, 2002; 32 pages.

First Office Action dated Sep. 6, 2023 for Chinese Patent Application No. 201880098823.9, 11 pages.

* cited by examiner

METHODS, WIRELESS DEVICE AND NETWORK NODE FOR COMMUNICATION IN A WIRELESS NETWORK

CROSS-REFERENCE TO RELATED APPLICATIONS

This application is a 35 U.S.C. § 371 national stage application for International Application No. PCT/SE2018/051066, entitled "METHODS, WIRELESS DEVICE AND NETWORK NODE FOR COMMUNICATION IN A WIRELESS NETWORK", filed on Oct. 19, 2018, the disclosures and contents of which are hereby incorporated by reference in their entireties.

TECHNICAL FIELD

The present disclosure relates generally to, a wireless device, a network node and methods therein, for communication between the wireless device and the network node in a wireless network.

BACKGROUND

In networks for wireless communication between wireless devices and network nodes, a wireless device can access the network by transmitting a pilot which can hopefully be detected by a network node within range to receive the pilot. When the network is comprised of cells, each cell being served by a network node, the wireless devices are able to use a pilot out of a limited selection of pilots that are orthogonal to one another. Orthogonal means basically that the pilots can be individually detected even if two or more pilots happen to be transmitted at the same time so that they "collide" when received by a network node. Using orthogonal pilots in a cell is possible as the number of wireless devices present in the cell is typically not more than the number of available orthogonal pilots.

However, it is envisaged that future networks will be "cell-free" which means that a wireless device is likely to be surrounded by several network nodes, sometimes also referred to as access points, within range to receive a pilot from the wireless device, particularly when massive MIMO with distributed antennas is employed to provide many potential access points for each wireless device. In such a scenario, the pilots are used universally in larger areas and not just in a limited cell area. It is a problem that the number of available orthogonal pilots in this case will be far too low, given the much larger number of wireless devices present in the area. It will thus not be possible to use orthogonal pilots in a cell-free network since there is simply not enough of them.

Another problem is that it is difficult for the network to keep track of where many wireless devices in idle state are located, and positioning of the devices requires a large overhead of signaling including tracking area updates and other configuration updates that must be signaled with each device. As a result, paging of an idle wireless device needs to be done across a relatively large area since the whereabouts of the idle wireless device may not be known with any accuracy. Further, when moving towards a cell-free network by merging cells into larger constellations, the knowledge about the exact position of wireless devices is reduced even more since the devices are not attached to any particular network nodes or tracking areas which makes it more "expensive", in terms of resource usage, to perform paging.

SUMMARY

It is an object of embodiments described herein to address at least some of the problems and issues outlined above. It is possible to achieve this object and others by using a wireless device, a network node, and methods therein, as defined in the attached independent claims.

According to one aspect, a method is performed by a wireless device for communication with a network node in a wireless network. In this method, the wireless device transmits a predetermined first pilot P1 associated with the wireless device, to indicate that the wireless device is in idle state. the wireless device also transmits a predetermined second pilot P2 associated with the wireless device, to indicate that the wireless device is in active state. The first and second pilots P1, P2 indicate identity of the wireless device, which means that the network node is able to determine the device's identity based on either of P1 and P2.

According to another aspect, a wireless device is arranged to communicate with a network node in a wireless network. The wireless device is configured to transmit a predetermined first pilot P1 associated with the wireless device, to indicate that the wireless device is in idle state. The wireless device is further configured to transmit a predetermined second pilot P2 associated with the wireless device, to indicate that the wireless device is in active state, wherein the first and second pilots P1, P2 indicate identity of the wireless device.

According to another aspect, a method is performed by a network node for communication with a wireless device in a wireless network. In this method, the network node detects that the wireless device is in idle state when receiving a predetermined first pilot P1 associated with the wireless device. The network node also detects that the wireless device is in active state when receiving a predetermined second pilot P2 associated with the wireless device, wherein the first and second pilots P1, P2 indicate identity of the wireless device.

According to another aspect, a network node is arranged to communicate with a wireless device in a wireless network. The network node is configured to detect that the wireless device is in idle state when receiving a predetermined first pilot P1 associated with the wireless device. The network node is further configured to detect that the wireless device is in active state when receiving a predetermined second pilot P2 associated with the wireless device, wherein the first and second pilots P1, P2 indicate identity of the wireless device.

The above wireless device, network node and methods therein may be configured and implemented according to different optional embodiments to accomplish further features and benefits, to be described below.

A computer program is also provided comprising instructions which, when executed on at least one processor in either of the above wireless device and network node, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable a wireless network to keep track of wireless devices and their states without requiring a large signaling overhead, and to allow the devices to use different individual pilots even when the number of devices is large in a given area. This can be accomplished by letting each wireless device transmit a predetermined first pilot P1 associated with the wireless device, to indicate that the wireless device is in idle state, and transmit a predetermined second pilot P2 associated with the wireless device, to indicate that the wireless device is in active state. The pilots P1 and 2 may be non-orthogonal to each other and to other pilots used in the network, which would increase the number of available pilots immensely compared to using only orthogonal pilots, given a certain number of available information bits. The pilots P1 and 2 may further be generated from an identity number of the wireless device, which enables identification of the wireless device based on either of P1 and P2.

Thereby, a network node receiving either of the pilots P1, P2 is able to identify the wireless device and to perform positioning of the wireless device in an efficient manner. When receiving the first pilot P1 indicating idle state, the network node can refrain from responding and merely perform positioning, while the second pilot P2 indicating active state will be interpreted as a request to access the network when data is pending in the wireless device for uplink transmission.

Figure 1:
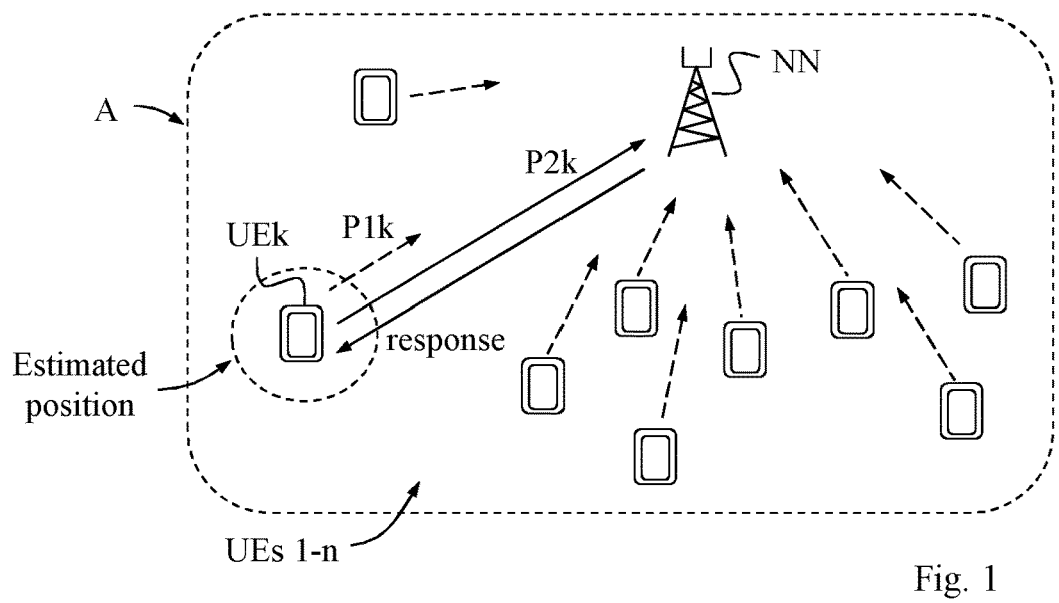
FIG. 1 is a communication scenario illustrating how a wireless device may transmit two pilots, according to some example embodiments.

FIG. 1 illustrates an example scenario where a network node NN of a wireless network receives pilots indicating idle state (dashed arrows) from a large number of wireless devices denoted UEs 1-$n$, including a wireless device denoted UEk which transmits its first pilot P1$k$ at regular intervals, e.g. periodically, as long as it remains in the idle state. The network node NN is able to receive pilots from any devices located within an area A. Repeated transmissions of pilots P1 indicating idle state from the wireless devices enable the network node NN to keep track of the devices and their positions. It should be noted that the idle state pilots (P1) are not directed to any particular network node, they are just transmitted out from the devices so that any network node(s) within reach can receive the pilots and use them for identification and positioning. When transmitting the idle state pilots, the wireless devices expect no response from any network node. In this example, network node NN is able to identify UEk and estimate its position with an accuracy as indicated by a dashed circle, thanks to receiving the pilot P1$k$.

As noted above, the network node NN keeps track of which devices are currently located within the area A as well as their estimated positions, and whenever a pilot P1 or P2 is received, the network node NN can limit a "search space" to a candidate list of pilots used by the devices present in area A when trying to identify the pilot. In some examples, to be further described below, the network node NN may even define smaller pilot groups for wireless devices currently located within certain limited sub-areas, based on knowledge of their positions, and assign the pilot groups to specific radio resources, e.g. a certain reserved pilot time slot for each group, for transmission of pilots. Accordingly, the devices of that pilot group are instructed to transmit their pilots only on that radio resource while devices of another pilot group are instructed to transmit their pilots on another radio resource. This enables the network node NN to further limit the search space to only the relatively few devices that are registered as present in the sub-area of the pilot group, when receiving a pilot in that group's pilot time slot. The total area A may thus be divided into several sub-areas with a pilot group defined for each sub-area and a separate pilot time slot for transmission of pilots. This feature will considerably speed up and facilitate the process of identifying a pilot received in a particular pilot time slot since the pilot is typically identified by comparing or matching it to a limited set of possible candidate pilots forming the search space (or candidate list) of the corresponding pilot group. Basically, the smaller search space the faster identification.

At some point, the device UEk in FIG. 1 transmits its second pilot P2$k$ (full arrow) to indicate that it has entered the active state which may be triggered by data occurring in an uplink buffer of the device. The second pilot P2$k$ is likewise not addressed to any particular network node and the device UEk is not aware of any network node(s) nearby.

The network node NN can then conclude that the UEk identified by the pilot P2, attempts to access the network because data is pending in the wireless device for uplink transmission. As a result, network node NN transmits a response to the device UEk to grant access to the network, indicated by a full arrow back to UEk. Since UEk's position is known with some accuracy, network node NN may be able to transmit the response using beamforming which means that the response is transmitted only within a narrow beam directed towards UEk. The response may include a new orthogonal pilot to be used in subsequent transmissions from UEk in active state. As in conventional procedures for contention based access, the UEk may not receive any response from the network and will therefore need to transmit the P2 again repeatedly until the network responds.

An example of how the above-described pilots P1 and P2 may be employed will now be described with reference to the signaling diagram in FIG. 2 involving a wireless device 200 and a network node 202 of a wireless network. The wireless device 200 corresponds to UEk in FIG. 1 and the network node 202 corresponds to NN in FIG. 1.

It is assumed that the first pilot P1 and the second pilot P2 have been assigned to the wireless device 200, the device 200 can be identified from either of P1 and P2, and that the device 200 is located within reach of the network node 202 in the sense that signals transmitted from the wireless device 200 can be received and "heard" by the network node 202. It is further assumed that either of P1 and P2 indicates identity of the wireless device 200 which enables identification of device 200 based on the first and second pilots P1 and P2. As a result, whenever receiving either of P1 and P2, the network node 202 is able to extract the identity of the wireless device 200 from P1 or P2. For example, the pilots P1, P2 may be pseudo-random sequences generated from an identity number of the wireless device.

In this example, the wireless device 200 is initially in idle state, meaning that it has no connection or attachment to any particular network node and does not communicate any data with the network. A first action 2:1 illustrates that the wireless device 200 is required to transmit its first pilot P1$k$ which is received by the network node 202, the first pilot P1$k$ indicating the idle state of device 200.

In a next action 2:2, the network node 202 identifies the wireless device 200 based on the received pilot P1$k$, e.g. by matching or comparing P1$k$ with a search space of candidate pilots P1(1-$x$) assigned to a number of wireless devices 1-$x$ that are currently present in an area covered by the network node 202. It was mentioned above that such a search space may be limited to a group of pilots which are allowed to be transmitted on a particular time slot reserved for that pilot group, herein denoted pilot time slot, and that the pilot group may contain candidate pilots assigned to wireless devices located within a certain sub-area.

As also noted above, P1$k$ indicates the identity of the device 200 and the candidate pilots in the pilot group correspond to wireless devices present in a certain sub-area, which devices are thus required to transmit their pilots in a specific reserved pilot time slot. Having identified the wireless device 200, the network node 202 also estimates the position of the wireless device 200 based on the received pilot P1$k$. If the estimated position is found to be outside the sub-area of that group, P1$k$ and the wireless device 200 may be moved to a pilot group of another sub-area containing the (new) estimated position of the device.

In this example, it is assumed that the device 200 stays within the same (sub)area throughout the illustrated procedure. A further action 2:3 illustrates that the wireless device 200 continues to transmit the first pilot P1 to indicate idle state, which may be transmitted periodically as indicated by dashed arrows. This enables efficient paging of the wireless device 200 by the network node 202 whenever there is downlink data to be transmitted to the device 200 since its position, e.g. as shown in FIG. 1, can be accurately estimated and updated based on P1. It may even be possible to send a paging message to the wireless device 200 in a beamformed transmission directed towards the latest estimated position of the device. By enabling paging over a very limited area in this way, interference and the need for retransmissions can be substantially reduced.

At some point in this example, the wireless device 200 detects that it has data pending for uplink transmission, e.g. in a buffer or the like, in an action 2:4. The wireless device 200 thereby enters an active state and accordingly transmits the second pilot P2$k$ to indicate the active state, in another action 2:5. When receiving P2$k$, the network node 202 identifies the wireless device 200 based on the received pilot P2$k$, in an action 2:6 which could be performed in the same manner as in action 2:2, and performs channel estimation based on the received P2$k$. The channel estimation is used for transmitting a beamformed response with an acknowledgement to the device 200, in an action 2:7. That acknowledgment in turn, may comprise an assignment of a new pilot to the device 200, and that new pilot in turn may be orthogonal to all other pilots current in use in the area, such that subsequent pilot transmissions from the device 200 will be interference-free to ensure proper reception at the network node 202.

A regular attachment procedure may now follow so that the wireless device 200 becomes connected to the network node 202 for assignment of radio resources and communication of data. The active state is sometimes also referred to as a connected state. A final action 2:8 illustrates that the wireless device 200 transmits its pending data to the network node 202, using the new orthogonal pilot. From this example it is evident that the amount of signaling between the wireless device 200 and the network node 202 is reduced as compared to conventional procedures.

An example of how the solution may be employed in terms of actions performed by a wireless device such as the wireless device 200, is illustrated by the flow chart in FIG. 3 which will now be described with further reference to FIG. 2. FIG. 3 thus illustrates a procedure in the wireless device 200 for communication with a network node 202 in a wireless network. Some optional example embodiments that could be used in this procedure will also be described.

A first action 300 illustrates that the wireless device 200 transmits a predetermined first pilot P1 associated with the wireless device, to indicate that the wireless device 200 is in idle state. This action corresponds to actions 2:1 and 2:3 in FIG. 2.

Figure 2:
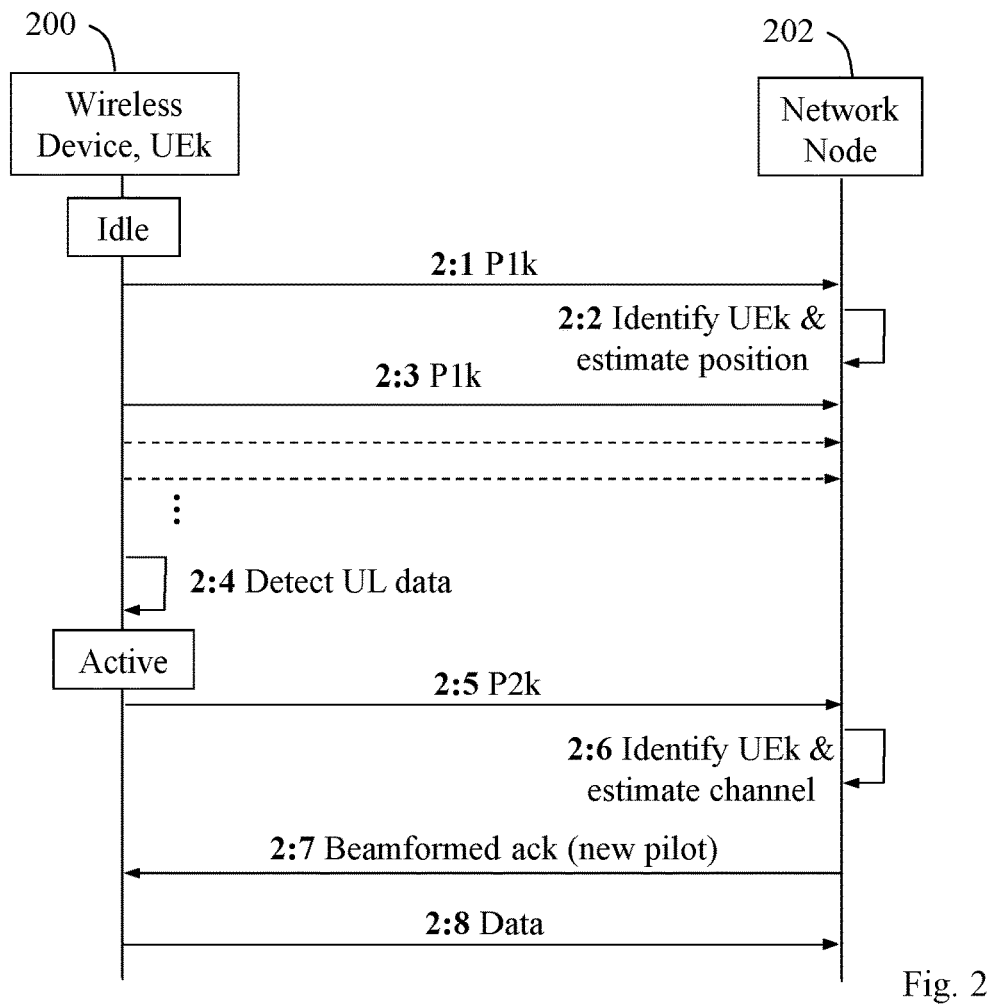
FIG. 2 is a signaling diagram illustrating an example of how the solution may be employed, according to further example embodiments.
Figure 3:
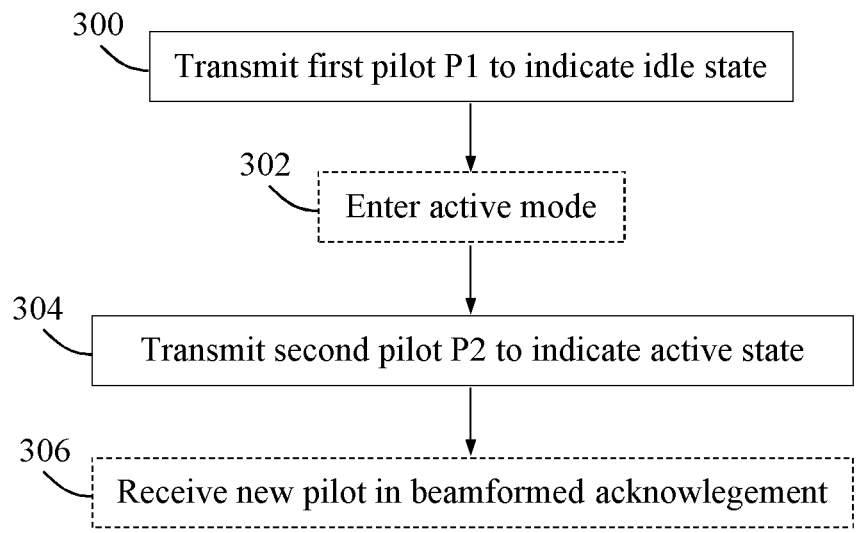
FIG. 3 is a flow chart illustrating a procedure in a wireless device, according to further example embodiments.

In another action 302, the wireless device 200 may change its state from idle to active, e.g. when detecting pending data for uplink transmission, which was also indicated in FIG. 2. In another action 304, the wireless device 200 transmits a predetermined second pilot P2 associated with the wireless device, to indicate that the wireless device is in the active state, which corresponds to action 2:5 in FIG. 2.

Both P1 and P2 indicate an identity of the wireless device so that the identity is derivable from either of P1 and P2, which is implied by P1 and P2 being associated with the device 200 as said above in actions 300 and 304. Thereby, when receiving the first and second pilots P1, P2, the network node 202 is able to keep track of the wireless device's 200 state and to determine its position based on the pilots P1 and P2. The amount of signaling and latency for paging the device 200, when needed, will be significantly reduced. Either of P1 and P2 can thus be used by the network node 202 as a basis for determining identity of the wireless device 200. For example, P1 and P2 may explicitly point to the device's identity as a "one-to-one" mapping, or some further information may be needed together with P1 or P2, such as which time slots are used by the device, to unambiguously determine the identity.

In a final action 306, after transmitting the pilot P2, the wireless device 200 may receive a beamformed acknowledgement with a new pilot from the network node 202, which corresponds to action 2:7 in FIG. 2.

Some examples of embodiments that may be employed in the above procedure in FIG. 3 will now be described. It was mentioned above that P1 and P2 should be defined so that the identity of the wireless device 200 can be derived from either of P1 and P2. In one example embodiment, the first and second pilots P1, P2 may be pseudo-random sequences generated from an identity number assigned to the wireless device, to enable identification of the wireless device based on at least one of the first and second pilots P1 and P2. This means that this identity number can be reversely extracted from P1 or P2 when knowing how the pseudo-random sequences have been generated.

In another example embodiment, the first and second pilots P1 and P2 may be non-orthogonal to pilots assigned to other wireless devices. As mentioned above, this means that the number of available pilots is immensely larger than the number of available orthogonal pilots, given a limited number of bits that can be used for defining the pilots.

In another example embodiment, when detecting data pending for uplink transmission as in action 2:4 above, the wireless device may transmit the second pilot P2 to request access to the network for transmitting the pending data. The network node 202 will interpret the pilot P2 accordingly and grant the access request in an attachment procedure which may be performed as such more or less according to regular procedures.

In another example embodiment, when transmitting the second pilot P2 the wireless device may receive from the network node 202 a new pilot assigned to the wireless device for use in subsequent transmissions from the wireless device in active state, the new pilot being orthogonal to pilots assigned to other wireless devices. In another example embodiment, the above new pilot may be received in a beamformed acknowledgement in response to the second pilot P2. The latter two embodiments correspond to either of the above actions 2:7 and 306.

In another example embodiment, the wireless device 200 may transmit the first pilot P1 at predefined intervals to enable positioning of the wireless device. Thereby, the network node 202 is able to keep track of the whereabouts of the wireless device 200, based on the P1 transmissions. When this embodiment is employed, another example embodiment may be that said predefined intervals have been assigned to the wireless device. In another example embodiment, it is also possible that the wireless device can decide to omit transmission of the first pilot P1 when detecting that it has not changed position significantly since a preceding transmission of first pilot P1. This will both save battery in the device and reduce radio interference in the air by transmitting P1 only when the position has changed and needs to be updated at the network node 202.

It was mentioned above that different pilot groups can be defined for devices located in different sub-areas so as to limit the search space for the network node 202 when detecting transmitted pilots in a particular timeslot reserved for a specific pilot group. Hence in another example embodiment, at least one of the first and second pilots P1, P2 may be assigned to a pilot group for wireless devices within a limited area, and in this case the wireless device 200 may transmit the first pilot P1 and/or the second pilot P2 in a pilot time slot reserved for said pilot group. Some examples of how pilot groups and corresponding pilot time slots could be employed will be described later below with reference to FIGS. 6A and 6B.

Figure 4:
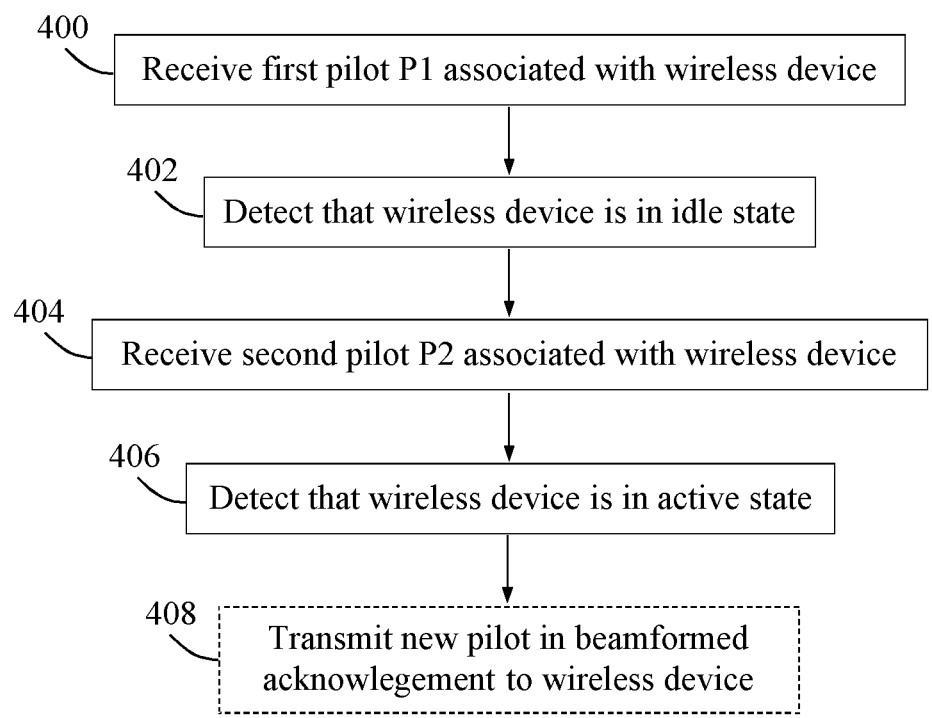
FIG. 4 is a flow chart illustrating a procedure in a network node, according to further example embodiments.

Another example of how the solution may be employed in terms of actions performed by a network node such as the network node 202, is further illustrated by the flow chart in FIG. 4 which will now be described likewise with further reference to FIG. 2. FIG. 4 thus illustrates a procedure in the network node 202 for communication with a wireless device 200 in a wireless network. Some optional example embodiments that could be used in this procedure will also be described.

A first action 400 illustrates that the network node 202 receives a predetermined first pilot P1 associated with the wireless device 200, which corresponds to either of the above actions 2:1, 2:3 and 300. A further action 402 illustrates that the network node 202 detects that the wireless device is in idle state when receiving the first pilot P1, which corresponds to the above action 2:2.

In another action 404, the network node 202 receives a predetermined second pilot P2 associated with the wireless device 200, which corresponds to either of the above actions 2:5 and 304. Another action 406 illustrates that the network node 202 detects that the wireless device is in active state when receiving the second pilot P2, which basically corresponds to the above action 2:6. Action 406 corresponds to action 308. The first and second pilots P1, P2 indicate identity of the wireless device, which means that the identity of the wireless device can be determined based on either of P1 and P2. In a final action 408, the network node 202 may transmit a new pilot to the wireless device for use in subsequent transmissions in active state, as also shown in the above action 2:7.

Some examples of embodiments that may be employed in the above procedure in FIG. 4 will now be described. It was mentioned above that P1 and P2 should be defined so that the identity of the wireless device 200 can be derived from either of P1 and P2. In one example embodiment, the first and second pilots P1, P2 may be pseudo-random sequences generated from an identity number assigned to the wireless device, so that the network node 202 is able to identify the wireless device 200 based on at least one of the first and second pilots P1 and P2. This possibility has also been mentioned above as an example embodiment for the procedure of FIG. 3. In another example embodiment, the first and second pilots P1 and P2 may be non-orthogonal to pilots assigned to other wireless devices, which has likewise been mentioned above.

In another example embodiment, the network node 202 may receive the second pilot P2 as a request to access the network for transmitting data pending in the wireless device.

In another example embodiment, when the second pilot P2 is received from the wireless device 200, the network node 202 may transmit to the wireless device 200 a new pilot assigned to the wireless device for use in subsequent transmissions from the wireless device in active state, the new pilot being orthogonal to pilots assigned to other wireless devices. This embodiment corresponds to either of the above actions 2:7, 306 and 408. If so, another example embodiment may be that the network node 202 transmits the new pilot in a beamformed acknowledgement to the wireless device 200, in response to the pilot P2.

In another example embodiment, the network node may refrain from sending a response to the wireless device 200 when receiving the second pilot P2. It was also indicated above that the wireless device 200 should not expect any response to the first pilot P1.

In another example embodiment, the network node 202 may perform positioning of the wireless device 200 when receiving the first pilot P1, which corresponds to the above action 2:2. In another example embodiment, the network node 202 may receive the first pilot P1 at regular intervals that have been assigned to the wireless device, which was also mentioned as a possible embodiment in the procedure of FIG. 3. Another example embodiment may be that the wireless device 200 is positioned further based on earlier position information of the wireless device. By knowing its latest determined position, the wireless device 200 can be positioned more easily by the network node 202 since the search space can be limited to a candidate list of pilots used by a limited set of devices present in a certain area, e.g. a sub-area as explained above.

The possibility to limit the search space by using specific timeslots reserved for transmissions of pilots belonging to a certain pilot group, has been described above. In another example embodiment, at least one of the first and second pilots P1, P2 may be assigned to a pilot group for wireless devices located within a limited area, and the first pilot P1 and/or the second pilot P2 is/are received in a pilot time slot reserved for said pilot group. If so, another example embodiment may be that network node 202 can identify the wireless device 200 by performing a limited search among pilots in said pilot group of the reserved pilot time slot. A further example embodiment may be that said detecting of idle and active state of the wireless device may comprise matching the received first and second pilot P1, P2, respectively, to the pilots in said pilot group. In another example embodiment, either of the received first and second pilots P1, P2 may be signalled to another network node which maintains said pilot group.

Figure 5:
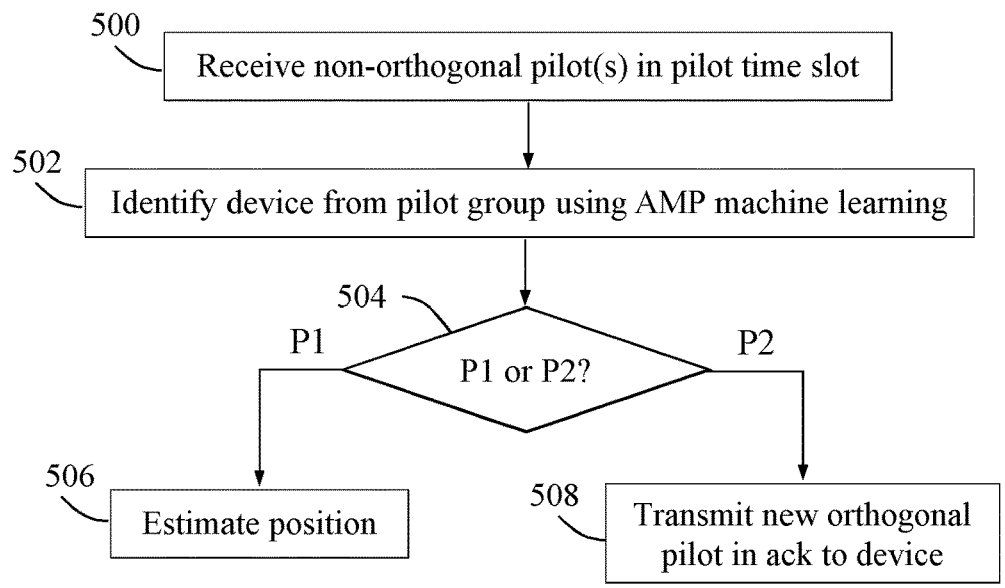
FIG. 5 is a flow chart illustrating an example of how a network node may operate in more detail, according to further example embodiments.

It was described above that the first and second pilots P1, P2 of the wireless device 200 could be assigned to a pilot group for wireless devices located within a certain limited area, sometimes denoted "sub-area", and that these wireless devices would then be required to transmit either pilot P1, P2 in a pilot time slot reserved for their pilot group. An example of how the network node 202 may operate is such a scenario will now be described with reference to the flow chart in FIG. 5 and with additional reference to FIG. 2.

A first action 500 illustrates that the network node 202 receives one or more non-orthogonal pilots in a certain pilot time slot which has been reserved for pilots of a specific pilot group. It is assumed that the network node 202 maintains a list or the like containing pilots P1, P2 associated with wireless devices that have been positioned within a certain sub-area, i.e. the pilots that belong to the pilot group in question. If one of the wireless devices is positioned to have moved outside the sub-area, its pilots P1, P2 are deleted from the pilot group and moved to another pilot group defined for devices within another sub-area that the device 200 has entered.

In a next action 502, the network node 202 tries to identify a wireless device 200 in the pilot group by using a machine learning procedure known as Approximate Message Passing, AMP. Briefly described, machine-learning algorithms can be used to detect whether a particular UE, i.e. a wireless device, has transmitted data or not in a given resource block. It has been proposed that UEs in a system may be assigned non-orthogonal pilot sequences, and in a given resource block each of the UEs may either be silent or transmit its non-orthogonal pilot. When receiving one or more such non-orthogonal pilots, the network node may use the AMP machine learning algorithm to detect which ones of the UEs that transmitted a pilot in the resource block in question and which UEs have been silent.

Here it is assumed that the wireless device 200 could be identified in action 502 using AMP. Another action 504 illustrates that the network node 202 detects whether the received pilot is the first pilot P1 indicating idle state or the second pilot P2 indicating active state. If P1, the network node 202 refrains from transmitting a response and just performs positioning of the wireless device 200 in an action 506. If P2 in action 504, the network node 202 transmits a response to the wireless device 200 in an action 506, namely an acknowledgement including a new orthogonal pilot to be used by the wireless device 200 in subsequent transmissions in active state.

Figure 6A:
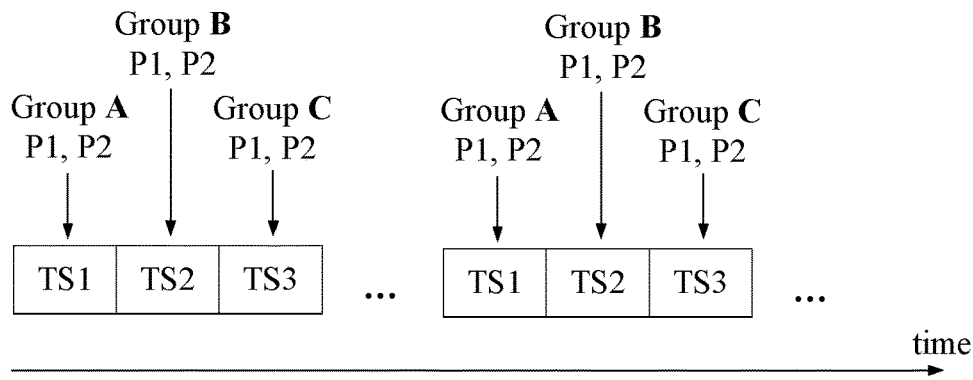
FIGS. 6A and 6B illustrate two examples of how pilots in different pilot groups may be transmitted in specific reserved pilot time slots, according to further example embodiments.

FIG. 6A shows a non-limiting but illustrative example of how the above-described feature of pilot groups could be employed by a network node 200. In this example, three different time slots TS1, TS2 and TS3 occur at regular intervals over time which allow three corresponding groups of pilots P1, P2 to be transmitted by wireless devices located in three different sub-areas, as also explained above. In more detail, TS1 is reserved for transmissions of P1, P2 from pilot group A, TS2 is reserved for transmissions of P1, P2 from pilot group B, and TS3 is reserved for transmissions of P1, P2 from pilot group C. It should be noted that the individual pilots P1, P2 are non-orthogonal but different from each other, and that detection of a received pilot is much facilitated by limiting the search space. In this example, the network node 200 only needs to search among the pilot group A when trying to detect a pilot receiving in TS1, and so forth.

Figure 6B:
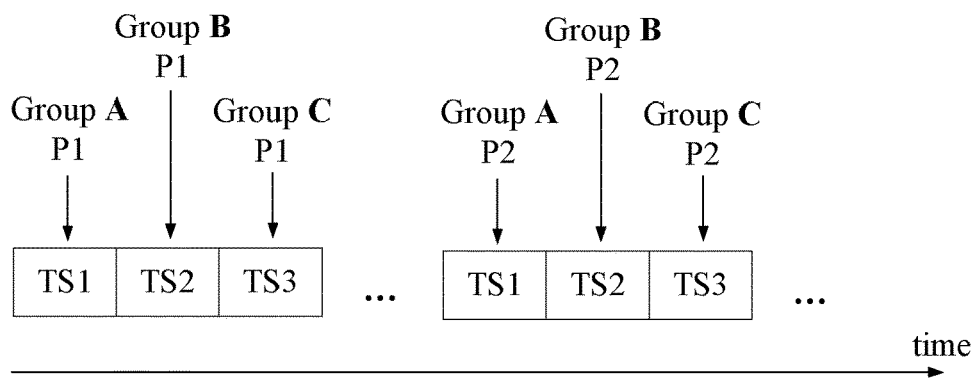

Another example of how pilot groups may be defined is shown in FIG. 6B. As in the previous example, three different time slots TS1, TS2 and TS3 are reserved for pilot groups A, B and C, respectively, but here only P1 is allowed to be transmitted in a first occurrence of TS1-TS3 and only P2 is allowed to be transmitted in a second occurrence of TS1-TS3, and so forth. In other words, each of P1 and P2 is allowed to be transmitted every second time TS1-TS3 occur. This will limit the search space even further since only one of P1 and P2 needs to be searched when receiving a pilot in a particular time slot.

The above examples of FIGS. 6A and 6B are schematically illustrated and in practice the time slots TS1-TS3 do not have to occur immediately after one another as shown, but there may be a number of time slots used for other transmissions between TS1 and TS2 and between TS2 and TS3. Further, it may be up to the network node 202 how to define the pilot groups and corresponding subareas depending on the circumstances. For example, at times when there are many wireless devices present within range of the network node, it is possible to define a large number of pilot groups for devices in relatively small subareas, while at times when there are fewer wireless devices around, it may be sufficient to define a small number of pilot groups for devices in larger subareas, so that the search space of each pilot group may be similar in both cases.

Some further observations and features of the above-described examples and embodiments will now be discussed.

It has been mentioned that the first pilot P1 may be transmitted at periodic time instances, thereby informing the network about the position of the device. These time-instances may be somewhat sparse in time and thus the number of pilot candidates at each time instance can be quite low due to the known positions of the periodic signals. Note that prior positioning information can also be used to limit the search further even if the positioning could need to consider a quite large potential area for some devices. Hence, even when every device transmits its first pilot P1 regularly, the search space can be kept small and efficiently solved using AMP despite the use of non-orthogonal signals.

The unique second pilot P2 for accessing the network is used to directly identify the wireless device. This active state pilot P2 is allowed to be transmitted in a pilot time slot that occurs regularly, and P2 can thus be initiated at any time to achieve very low latency access. That is, the network node is able to directly identify the device without any additional steps of contention resolution as in conventional procedures. P2 may be unique as such alone, or in combination with the time slot used for the transmission. The identity search is distributed so that every node/area only has a limited number of such pilots to search, thanks to the positioning information acquired from the first pilot P1, e.g. in combination with the pilot time slot used for the transmission. Otherwise, the search would be virtually impossible to perform if the network node had to search for every possible pilot.

It should be noted that for some devices, e.g. when users have turned on their phones for the first time or after a prolonged turned-off period, a conventional random access procedure may be needed as a fallback when the device's (previous) position is not known at all. But with the above-described solution this conventional procedure could be required very seldom.

For wireless devices detected to be in active state, the network node does not respond but it updates a database or the like such that the network can keep track of which wireless devices are in active state and in idle state, respectively. This database may also associate an identity number of each wireless device with its state status.

Furthermore, every time the network node detects a pilot transmission from a wireless device, it estimates the geographical location (position) of that wireless device, or at least its position in relation to the network nodes deployed in the network. This position estimation is conveniently facilitated by the above-described uplink pilots in a cell-free massive MIMO system where network nodes are commonly referred to as Transmission/Reception Points, TRPs. These position estimates may be collected into the database such that the database also keeps track of where all the different wireless devices are located. The estimated positions can be used to determine a candidate list of pilots that the network node will try to detect. A neighborhood pilot list may also be used to determine a slightly larger set of TRPs than only the TRPs that receive the strongest signals. This may be done to capture the wireless devices' mobility and not lose track of any device when it moves towards some other set of TRPs. It should be noted that some TRPs may currently not have the ability to detect the transmitted pilots, such as small indoor TRPs with very short coverage.

It will now be described how one or more pilot time slots may be determined for a pilot group. One feature of some embodiments herein is that position information can be used to limit the number of pilots that need to be searched in a reserved pilot time slot which gives a set of devices the opportunity to transmit their pilots, as also described above.

Each pilot time slot can allow transmission of P1 or P2 or both, as also illustrated in FIGS. 6A and 6B. In the case of FIG. 6B, some computational optimizations may be achieved at the network node in the case of joint detection of several pilots, using the knowledge that each device only transmits either P1 or P2.

Further, to control the number of possible pilot candidates in each pilot time slot, the network may dynamically vary the number of pilot time slots that is used, e.g. depending on how many devices are present. For example, a rural network node with 100 devices present may use a single pilot time slot while a network node in the city center with 1000 devices present may more beneficially use 10 pilot time slots to maintain a reasonable number of pilot candidates per slot.

It will now be described how positioning ambiguity in this context may be resolved. When the position of a particular wireless device is detected to be uncertain based on a received pilot. In that case, the network node may additionally perform a paging attempt to the wireless device to force the device to perform communication with the network node. This communication is thus useful to resolve the positioning ambiguity. One such case can be that the wireless device does not answer the paging which may indicate that it is not in the estimated position.

It will now be described how a wireless network can be dimensioned to take advantage of the above-described embodiments. In order to limit complexity on the network node side, a reasonable number of detection attempts and overhead will now be discussed. Typically a network is dimensioned to keep the number of users in a cell quite constant. But clearly the most loaded cells will have more users than cells used for area coverage. Hence, in this example dimensioning will be considered for a network operator having 10 000 000 subscribers and 10 000 TRPs, while using a 1 sec paging cycle and 10 ms access delay. This implies that the network knows on a quite detailed level where each device is located making the access procedure "easy". Then a 1% activity probability per second will be considered.

For the AMP algorithm, 100 known pilot identifications per block, or 10 pilot identifications among 1000 candidates, may be considered. With these numbers, there are 300 2 PRB blocks per second available for positioning if each device is triangulated to 3 TRPs each with 1000 devices and we further get 300 2 PRB blocks for access. This implies that there are roughly 1200 PRBs per second which on a 20 MHz carrier is just 1.2% overhead in total for all system access and paging resources for the two pilots in the solution. Note that there is some additional overhead since a downlink sync signal is also needed from the network node for the device to sync towards the network node.

Figure 7:
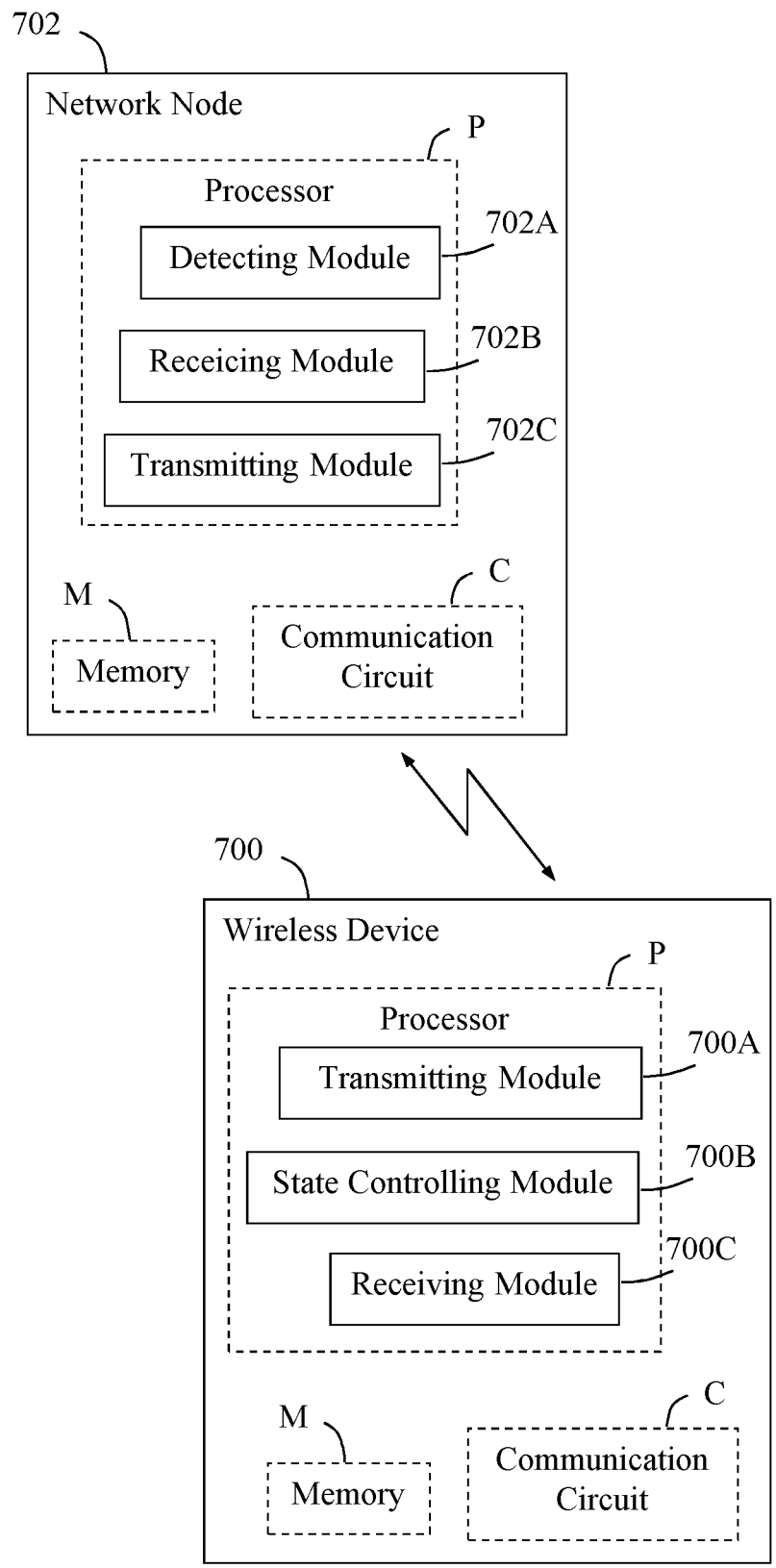
FIG. 7 is a block diagram illustrating how a wireless device and a network node may be structured, according to further example embodiments.

The block diagram in FIG. 7 illustrates a detailed but non-limiting example of how a wireless device 700 and a network node 702, respectively, may be structured to bring about the above-described solution and embodiments thereof. In this figure, the wireless device 700 and the network node 702 may be configured to operate according to any of the examples and embodiments of employing the solution as described herein, where appropriate. Each of the wireless device 700 and the network node 702 is shown to comprise a processor "P", a memory "M" and a communication circuit "C" with suitable equipment for transmitting and receiving radio signals in the manner described herein.

The communication circuit C in each of the wireless device 700 and the network node 702 thus comprises equipment configured for communication with each other using a suitable protocol for the communication depending on the implementation. The solution is however not limited to any specific types of radio signals or protocols.

The wireless device 700 is, e.g. by means of units, modules or the like, configured or arranged to perform at least some of the actions of the flow chart in FIG. 3 as follows. Further, the network node 702 is, e.g. by means of units, modules or the like, configured or arranged to perform at least some of the actions of the flow chart in FIG. 4 as follows.

The wireless device 700 is arranged to communicate with a network node 702 in a wireless network. The wireless device 700 is configured to transmit a predetermined first pilot P1 associated with the wireless device 700, to indicate that the wireless device is in idle state. This operation may be performed by a transmitting module 700A in the wireless device 700, as illustrated in action 300.

The wireless device 700 may be further configured to change its state from idle to active, e.g. when detecting that there is data in an uplink buffer or the like to be transmitted to the network. This operation may be performed by a state controlling module 700B in the wireless device 700, as illustrated in action 302. The state controlling module 700B could alternatively be named a logic module.

The wireless device 700 is further configured to transmit a predetermined second pilot P2 associated with the wireless device 700, to indicate that the wireless device is in active state. This operation may be performed by the transmitting module 700A, as illustrated in action 304. The first and second pilots P1, P2 indicate identity of the wireless device, which has also been explained above.

The wireless device 700 may be further configured to receive a beamformed acknowledgement in response to the second pilot P2, which may contain a new pilot assigned to the wireless device for use in subsequent transmissions from the wireless device in active state. This operation may be performed by a receiving module 700C in the wireless device 700 as illustrated in action 306. The new pilot may be orthogonal to pilots assigned to other wireless devices.

The network node 702 is arranged to communicate with a wireless device 700 in a wireless network. The network node 702 is configured to detect that the wireless device is in idle state when receiving a predetermined first pilot P1 associated with the wireless device. This operation may be performed by a detecting module 702A in the network node 702 as illustrated in action 402. A receiving module 702B in the network node 702 may be used for receiving the first pilot P1, as also illustrated in action 400. The detecting module 702A could alternatively be named a logic or discovering module.

The network node 702 is further configured to detect that the wireless device is in active state when receiving a predetermined second pilot P2 associated with the wireless device. This operation may be performed by the detecting module 702A as illustrated in action 406. The receiving module 702B may be used also for receiving the second pilot P2, as also illustrated in action 404. The first and second pilots P1, P2 indicate identity of the wireless device, The network node 702 may also be configured to transmit to the wireless device 700 a new pilot assigned to the wireless device 700 for use in subsequent transmissions from the wireless device 700 in active state, the new pilot being orthogonal to pilots assigned to other wireless devices. This operation may be performed by a transmitting module 702C in the network node 702, as illustrated in action 408.

It should be noted that FIG. 7 illustrates various functional modules in the wireless device 700 and the network node 702, respectively, and the skilled person is able to implement these functional modules in practice using suitable software and hardware equipment. Thus, the solution is generally not limited to the shown structures of the wireless device 700 and the network node 702, and the functional modules therein may be configured to operate according to any of the features, examples and embodiments described in this disclosure, where appropriate.

The functional modules 700A-C and 702A-C described above may be implemented in the wireless device 700 and the network node 702, respectively, by means of program modules of a respective computer program comprising code means which, when run by the processor P causes the wireless device 700 and the network node 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 700 and the network node 702 in the form of a memory having a computer readable medium and being connected to the processor P. The computer program product or memory M in each of the wireless device 700 and the network node 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 700 and network node 702.

The solution described herein may be implemented in each of the wireless device 700 and the network node 702 by a computer program comprising instructions which, when executed on at least one processor, cause the at least one processor to carry out the actions according to any of the above embodiments and examples, where appropriate. The solution may also be implemented at each of the wireless device 700 and the network node 702 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "network node", "pilot", "identity number", "pseudo-random sequence", "pilot group" and "pilot time slot" have been used throughout this disclosure, although any other corresponding entities, functions, and/or parameters could also be used having the features and characteristics described here. The solution is defined by the appended claims.

The project leading to this application has received funding from the European Unions Horizon 2020 research and innovation programme under grant agreement No 641985.

The invention claimed is:

1. A method performed by a wireless device for communication with a network node in a wireless network, the method comprising:

transmitting a predetermined first pilot associated with the wireless device, to indicate that the wireless device is in idle state, and transmitting a predetermined second pilot associated with the wireless device, to indicate that the wireless device is in active state, wherein the first and second pilots indicate identity of the wireless device, wherein when transmitting the second pilot the wireless device receives from the network node a new pilot assigned to the wireless device for use in subsequent transmissions from the wireless device in active state, the new pilot being orthogonal to pilots assigned to other wireless devices, and wherein the new pilot is received in a beamformed acknowledgement in response to the second pilot.

2. The method according to claim 1, wherein the first and second pilots are pseudo-random sequences generated from an identity number assigned to the wireless device, to enable identification of the wireless device based on at least one of the first and second pilots, and wherein the first and second pilots are non-orthogonal to pilots assigned to other wireless devices.

3. The method according to claim 1, wherein when detecting data pending for uplink transmission, the wireless device transmits the second pilot to request access to the network for transmitting the pending data.

4. The method according to claim 1, wherein the wireless device transmits the first pilot at predefined intervals to enable positioning of the wireless device, and wherein said predefined intervals have been assigned to the wireless device.

5. The method according to claim 4, wherein the wireless device decides to omit transmission of the first pilot when detecting that it has not changed position significantly since a preceding transmission of first pilot.

6. The method according to claim 1, wherein at least one of the first and second pilots is assigned to a pilot group for wireless devices within a limited area, and the wireless device transmits the first pilot and/or the second pilot in a pilot time slot reserved for said pilot group.

7. A wireless device arranged to communicate with a network node in a wireless network, wherein the wireless device is configured to:
   transmit a predetermined first pilot associated with the wireless device, to indicate that the wireless device is in idle state, and
   transmit a predetermined second pilot associated with the wireless device, to indicate that the wireless device is in active state, wherein the first and second pilots indicate identity of the wireless device, wherein when transmitting the second pilot the wireless device receives from the network node a new pilot assigned to the wireless device for use in subsequent transmissions from the wireless device in active state, the new pilot being orthogonal to pilots assigned to other wireless devices, and wherein the new pilot is received in a beamformed acknowledgement in response to the second pilot.

8. A method performed by a network node for communication with a wireless device in a wireless network, the method comprising:
   detecting that the wireless device is in idle state when receiving a predetermined first pilot associated with the wireless device, and
   detecting that the wireless device is in active state when receiving a predetermined second pilot associated with the wireless device, wherein the first and second pilots indicate identity of the wireless device, wherein when the second pilot is received from the wireless device, the method further comprising transmitting to the wireless device a new pilot assigned to the wireless device for use in subsequent transmissions from the wireless device in active state, the new pilot being orthogonal to pilots assigned to other wireless devices, and wherein the new pilot is transmitted in a beamformed acknowledgement to the wireless device.

9. The method according to claim 8, wherein the first and second pilots are pseudo-random sequences generated from an identity number assigned to the wireless device, the method further comprising identifying the wireless device based on at least one of the first and second pilots, and wherein the first and second pilots are non-orthogonal to pilots assigned to other wireless devices.

10. The method according to claim 8, wherein the second pilot is received as a request to access the network for transmitting data pending in the wireless device.

11. The method according to claim 8, wherein the network node refrains from sending a response to the wireless device when receiving the second pilot.

12. The method according to claim 8, wherein the network node performs positioning of the wireless device when receiving the first pilot, and wherein the first pilot is received at regular intervals that have been assigned to the wireless device.

13. The method according to claim 12, wherein the wireless device is positioned further based on earlier position information of the wireless device.

14. The method according to claim 8, wherein at least one of the first and second pilots is assigned to a pilot group for wireless devices located within a limited area, and the first pilot and/or the second pilot is/are received in a pilot time slot reserved for said pilot group.

15. The method according to claim 14, wherein the wireless device is identified by performing a limited search among pilots in said pilot group of the reserved pilot time slot.

16. The method according to claim 15, wherein said detecting of idle and active state of the wireless device comprises matching the received first and second pilot respectively, to the pilots in said pilot group.

17. The method according to claim 14, wherein either of the received first and second pilots is signalled to another network node which maintains said pilot group.

18. A network node arranged to communicate with a wireless device in a wireless network, wherein the network node is configured to:
   detect that the wireless device is in idle state when receiving a predetermined first pilot associated with the wireless device, and
   detect that the wireless device is in active state when receiving a predetermined second pilot associated with the wireless device, wherein the first and second pilots indicate identity of the wireless device, wherein when the second pilot is received from the wireless device, the method further comprising transmitting to the wireless device a new pilot assigned to the wireless device for use in subsequent transmissions from the wireless device in active state, the new pilot being orthogonal to pilots assigned to other wireless devices; and wherein the new pilot is transmitted in a beamformed acknowledgement to the wireless device.

* * * * *